(12) United States Patent
Collier et al.

(10) Patent No.: US 7,157,158 B2
(45) Date of Patent: Jan. 2, 2007

(54) ENCAPSULATED CERAMIC ARMOR

(75) Inventors: Steven Collier, Lake City, FL (US); Atakan Peker, Aliso Viejo, CA (US)

(73) Assignee: LiquidMetal Technologies, Tampa, FL (US)

( * ) Notice: Subject to any disclaimer, the term of this patent is extended or adjusted under 35 U.S.C. 154(b) by 373 days.

(21) Appl. No.: 10/386,728

(22) Filed: Mar. 11, 2003

(65) Prior Publication Data
US 2006/0269765 A1    Nov. 30, 2006

Related U.S. Application Data

(60) Provisional application No. 60/363,389, filed on Mar. 11, 2002.

(51) Int. Cl.
*C22C 45/10* (2006.01)

(52) U.S. Cl. ..................................... 428/698

(58) Field of Classification Search ............... 428/469, 428/420, 148, 304
See application file for complete search history.

(56) References Cited

U.S. PATENT DOCUMENTS

| | | |
|---|---|---|
| 2,106,145 A | 1/1938 | Floraday |
| 2,124,538 A | 7/1938 | Boyer |
| 3,322,546 A | 5/1967 | Tanzman et al. |
| 3,539,192 A | 11/1970 | Prasse |
| 3,776,297 A | 12/1973 | Williford et al. |
| 3,948,613 A | 4/1976 | Weill |
| 3,970,445 A | 7/1976 | Gale et al. |
| 3,986,867 A | 10/1976 | Masumoto et al. |
| 3,986,892 A | 10/1976 | Ewe et al. |
| 4,024,902 A | 5/1977 | Baum |
| 4,067,732 A | 1/1978 | Ray |
| 4,124,472 A | 11/1978 | Riegert |
| 4,125,737 A | 11/1978 | Andersson |
| 4,163,071 A | 7/1979 | Weatherly et al. |
| 4,260,416 A | 4/1981 | Kavesh et al. |
| 4,268,564 A | 5/1981 | Narasimhan |
| 4,330,027 A | 5/1982 | Narasimhan |
| 4,374,900 A | 2/1983 | Hara et al. |
| 4,381,943 A | 5/1983 | Dickson et al. |
| 4,396,820 A | 8/1983 | Puschner |
| 4,409,296 A | 10/1983 | Ward |
| 4,482,612 A | 11/1984 | Kuroki et al. |
| 4,487,630 A | 12/1984 | Crook et al. |
| 4,488,882 A | 12/1984 | Dausinger et al. |
| 4,499,158 A | 2/1985 | Onuma et al. |
| 4,515,870 A | 5/1985 | Bose et al. |
| 4,523,625 A | 6/1985 | Ast |
| 4,526,618 A | 7/1985 | Keshavan et al. |

(Continued)

FOREIGN PATENT DOCUMENTS

DE    010237992 A1    3/2003

(Continued)

OTHER PUBLICATIONS

Author umknown, "Standard Practice for Conducting Dry Sand/Rubber Wheel Abrasion Tests", Designation G 65—81, source unknown, pp. 351-368.

(Continued)

*Primary Examiner*—John J. Zimmerman
*Assistant Examiner*—Daniel Miller
(74) *Attorney, Agent, or Firm*—Christie, Parker & Hale, LLP

(57) ABSTRACT

An impact resistant clad composite armor which includes a ceramic core, and a layer of bulk amorphous alloy surrounding the ceramic core and preferably bonded chemically to the ceramic core and a method of manufacturing such armor is provided.

23 Claims, 13 Drawing Sheets

U.S. PATENT DOCUMENTS

| | | | |
|---|---|---|---|
| 4,557,981 | A | 12/1985 | Bergmann |
| 4,564,396 | A | 1/1986 | Johnson et al. |
| 4,585,617 | A | 4/1986 | Tenhover et al. |
| 4,612,059 | A | 9/1986 | Mori et al. |
| 4,656,099 | A | 4/1987 | Sievers |
| 4,668,310 | A | 5/1987 | Kudo et al. |
| 4,725,512 | A | 2/1988 | Scruggs |
| 4,731,253 | A | 3/1988 | DuBois |
| 4,741,974 | A | 5/1988 | Longo et al. |
| 4,770,701 | A | 9/1988 | Henderson et al. |
| 4,810,850 | A | 3/1989 | Tenkula et al. |
| 4,960,643 | A | 10/1990 | Lemelson |
| 4,987,033 | A | 1/1991 | Abkowitz et al. |
| 5,127,969 | A | 7/1992 | Sekhar |
| 5,189,252 | A | 2/1993 | Huffman et al. |
| 5,288,344 | A | 2/1994 | Peker et al. |
| 5,294,462 | A | 3/1994 | Kaiser et al. |
| 5,368,659 | A | 11/1994 | Peker et al. |
| 5,380,349 | A | 1/1995 | Taniguchi et al. |
| 5,440,995 | A | 8/1995 | Levitt |
| 5,482,577 | A | 1/1996 | Hashimoto et al. |
| 5,567,251 | A | 10/1996 | Peker et al. |
| 5,567,532 | A | 10/1996 | Peker et al. |
| 5,735,975 | A | 4/1998 | Lin et al. |
| 5,866,254 | A * | 2/1999 | Peker et al. .................. 428/378 |
| 6,010,580 | A | 1/2000 | Dandliker et al. |
| 6,183,889 | B1 | 2/2001 | Koshiba et al. |
| 6,218,029 | B1 | 4/2001 | Rickerby |
| 6,325,868 | B1 | 12/2001 | Kim et al. |
| 6,326,295 | B1 | 12/2001 | Figura |
| 2001/0052406 | A1 | 12/2001 | Kubota et al. |
| 2002/0036034 | A1 | 3/2002 | Xing et al. |

FOREIGN PATENT DOCUMENTS

| | | | |
|---|---|---|---|
| GB | 2005302 | A | 4/1979 |
| JP | 55-14090 | | 9/1981 |
| JP | 02001303218 | A | 10/2001 |
| WO | WO00/68469 | A2 | 11/2000 |
| WO | WO03/040422 | A1 | 5/2003 |

OTHER PUBLICATIONS

Koch et al., "Preparation of "Amorphous" $Ni_{60}Nb_{40}$ By Mechanical Alloying", Appl. Phys. Lett., Dec. 1983, vol. 43, No. 11, pp. 1017-1019.

Author unknown, "A World of Superabrasives Experience At Your Service", source unknown, 4 pgs.

Author unknown, "GE Superabrasives—The Metal Bond System", source unknown, 1 pg.

Author unknown, "GE Superabrasives—The Resin Bond System", source unknown, 1 pg.

Author unknown, "GE Superabrasives—Micron Powders", source unknown, 1 pg.

Author unknown, "GE Superabrasives—The MBS 700 Series Product Line", source unknown, 2 pgs.

Author unknown, "GE Superabrasives—The MBS-900 Series Product Line", source unknown, 2 pgs.

Masumoto, "Recent Progress in Amorphous Metallic Materials in Japan", Materials Science and Engineering, 1994, vol. A179/A180, pp. 8-16.

ASM Committee on Tooling Materials, "Superhard Tool Materials", Metals Handbook, Ninth Edition, vol. 3, Properties and Selection: Stainless Steels, Tool Materials and Special-Purpose Metals, American Society for Metals, 1980, pp. 448-465, title page and copyright page.

* cited by examiner

ENCAPSULATED CERAMIC ARMOR

CROSS REFERENCE TO RELATED APPLICATION

This application claims priority on U.S. Application No. 60/363,389, filed Mar. 11, 2002, the disclosure of which is incorporated herein by reference.

FIELD OF THE INVENTION

The present invention relates to the encapsulation of ceramic materials with bulk amorphous alloys and, more particularly, to an impact resistant ceramic armor encapsulated with bulk amorphous alloys and a method of forming such armor.

BACKGROUND OF THE INVENTION

Ceramic materials have long been considered for use in the fabrication of armor components because ceramic materials have a high hardness, are potentially capable of withstanding armor-piercing projectiles, and are relatively lightweight. However, the use of ceramic materials in armor applications has been limited by the low impact resistance of these materials, which results from ceramic's brittleness and lack of toughness. Indeed, one of the significant drawbacks to the use of ceramic materials in armor applications is that they lack repeat hit capability. In other words, ceramic materials tend to disintegrate upon the first hit and cease to be useful when subjected to multiple projectiles. For a more effective utilization of ceramic materials in armor applications, it is necessary to improve the impact resistance of this class of materials.

One method to overcome the disintegration of ceramic armors is to encapsulate the ceramic with a layer of surrounding metal. Such a method is disclosed in U.S. Pat. No. 4,987,033 incorporated herein by reference. However, there are still deficiencies with the encapsulation of ceramic cores in the prior art. First, because of the properties of the proposed metals, conventional casting processes cannot be readily and effectively utilized to encapsulate the ceramic cores. For example, the very high solidification shrinkage of metals (~6 to 12%) precludes this process as the encapsulating metal exerts undue stresses on the ceramic core and can result in the fracturing of the ceramic. As such more expensive encapsulation processes, such as, powder metallurgy techniques are used as disclosed in U.S. Pat. No. 4,987,033.

Accordingly, a need exists for an armor component formed of an encapsulated ceramic material that has improved impact resistance, and for an inexpensive method for forming an armor component from a ceramic material that has improved impact resistance.

SUMMARY OF THE INVENTION

The invention, as embodied and broadly described herein, is directed to an impact resistant composite armor which includes a ceramic core, and a layer of bulk amorphous alloy surrounding the ceramic core and preferably bonded chemically to the ceramic core.

In another embodiment, the invention is also directed to a method of forming an encapsulated ceramic armor from an amorphous alloy material.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The invention, is directed to a bulk amorphous alloy encapsulated impact resistant composite armor. The armor includes a ceramic core, and a layer of bulk amorphous alloy surrounding the ceramic core and preferably bonded chemically to the ceramic core.

Exemplary embodiments of composite armors in accordance with the present invention are chown schematically in FIGS. 1 to 5.

Figure 1:
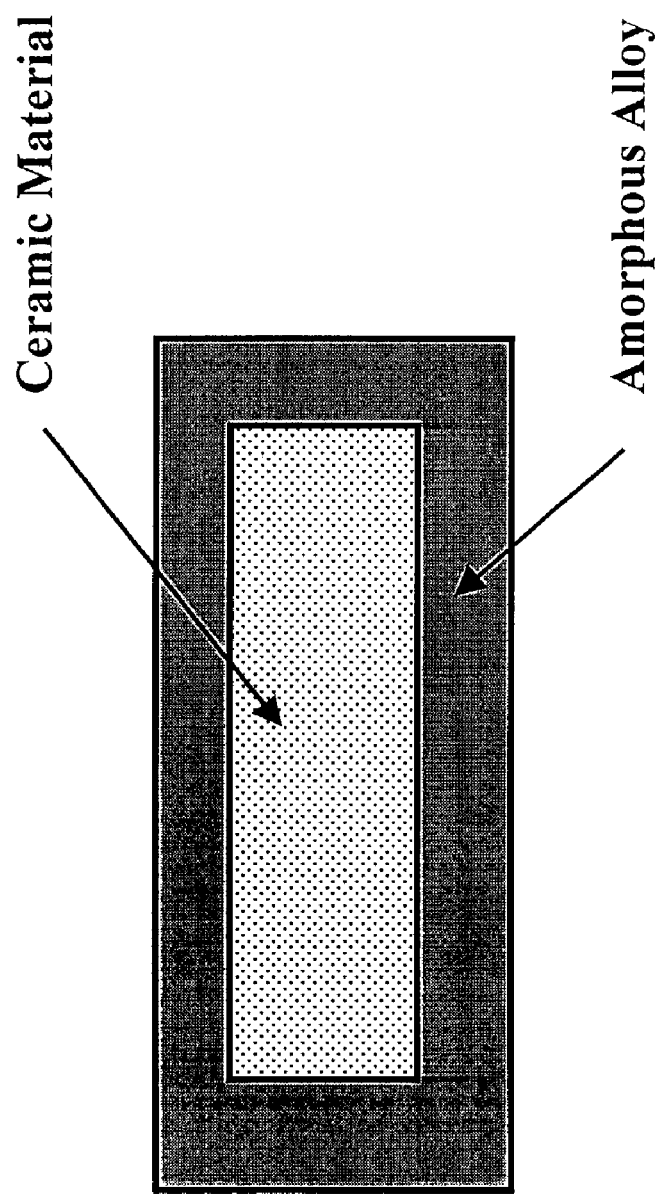
FIG. 1 is a schematic of a first exemplary embodiment of a composite armor in accordance with the present invention.
Figure 2:
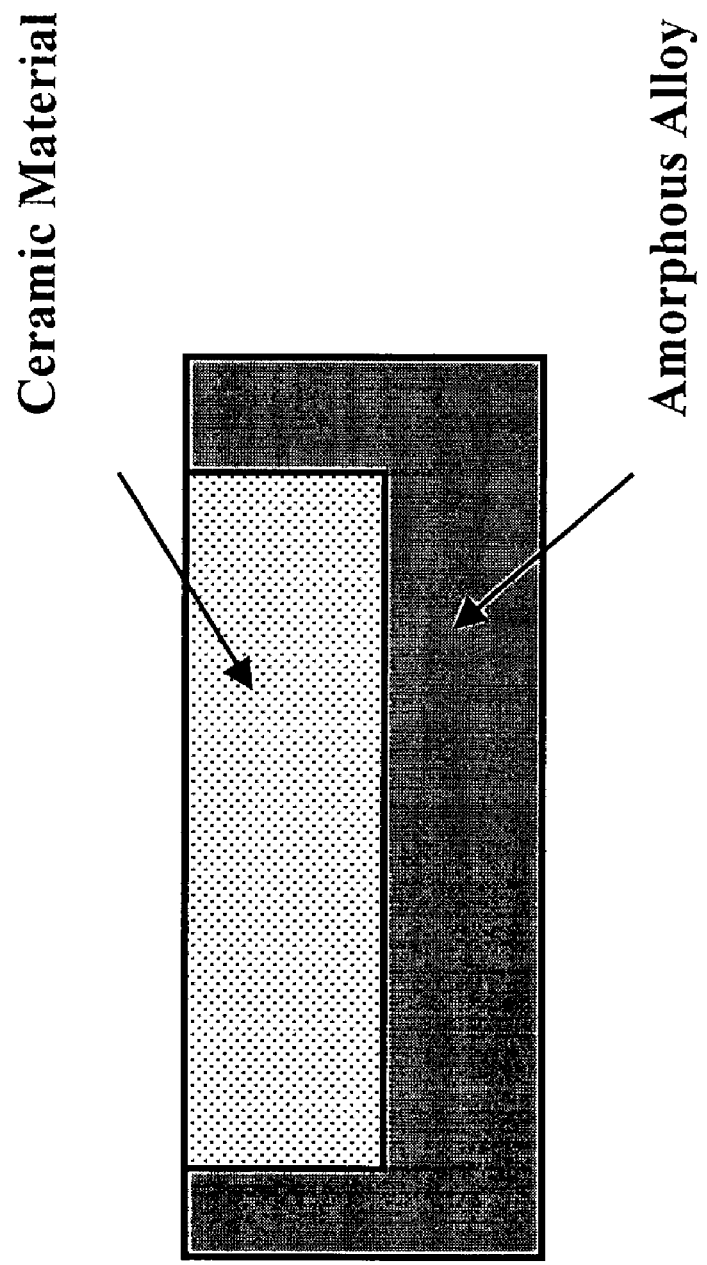
FIG. 2 is a schematic of a second exemplary embodiment of a composite armor in accordance with the present invention.

The geometry of the ceramic-amorphous alloy configuration can take a variety of forms. In one particular form, a monolithic single piece of ceramic material (a tile) is fully encapsulated by an amorphous alloy material, as shown in FIG. 1. In another form, one face of the ceramic armor can be left exposed as shown in FIG. 2. The ceramic tile dimension can vary from 2"×2" up to 30"×30" or more depending on the availability and the quality of the specific ceramic material. The thickness of the tile can be from 0.1" to 1.0" or more. The tile geometry can be in any shape such as rectangular, square, hexagonal, triangular. The use of such single-piece monolithic ceramics is desired for higher effectiveness of armor.

Figure 3:
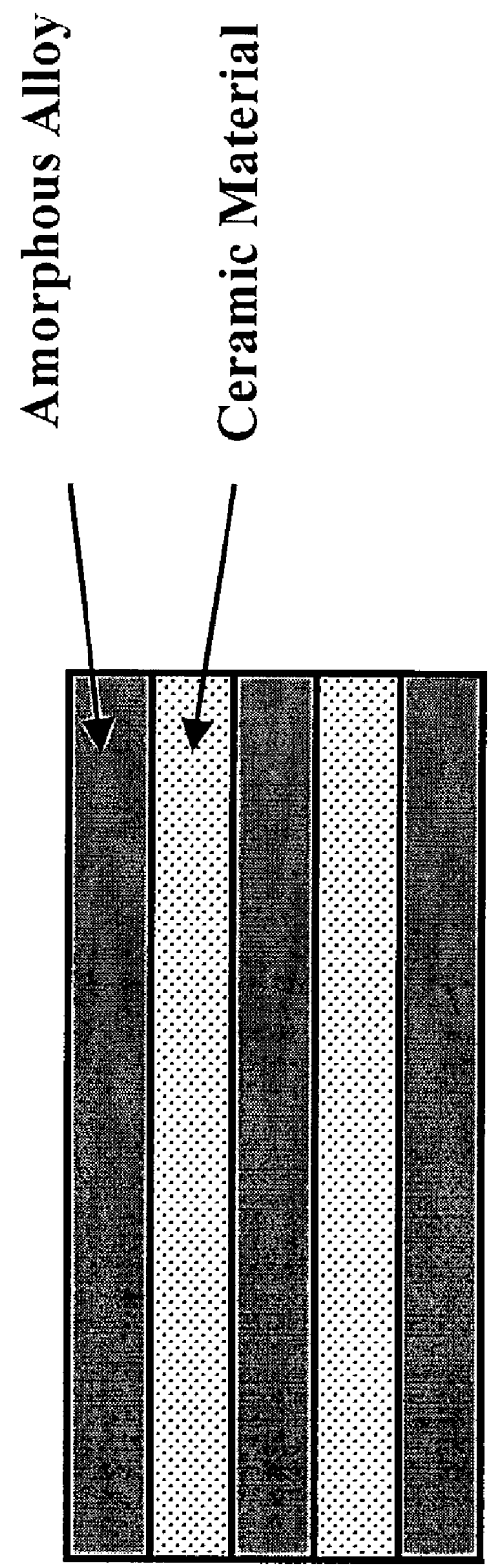
FIG. 3 is a schematic of a third exemplary embodiment of a composite armor in accordance with the present invention.
Figure 4:
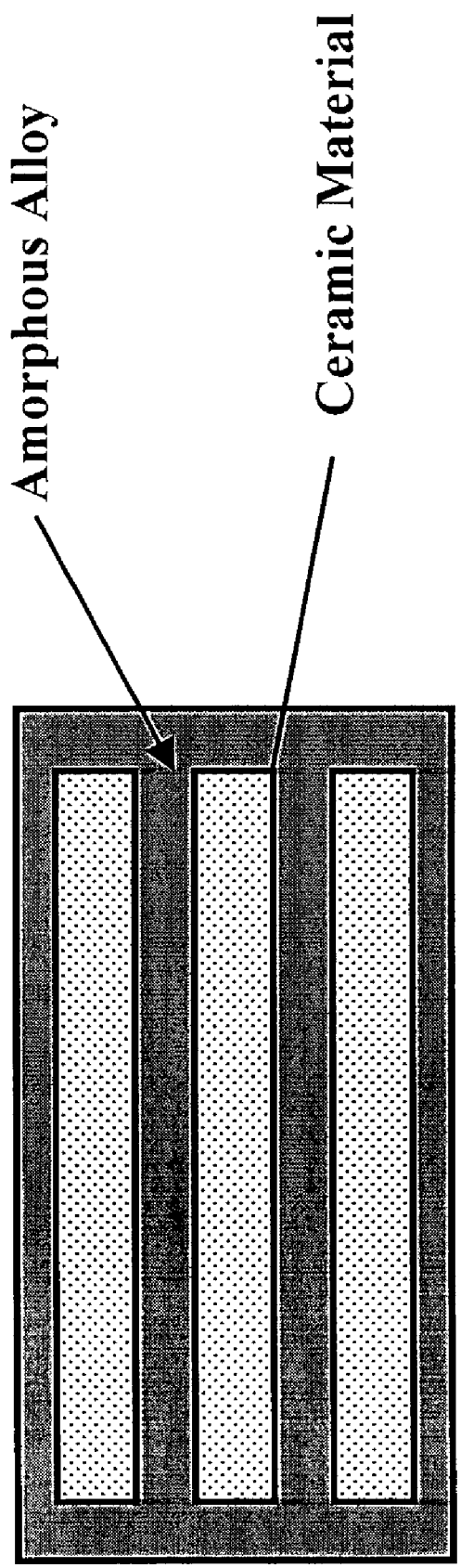
FIG. 4 is a schematic of a fourth exemplary embodiment of a composite armor in accordance with the present invention.

In another embodiment of the invention, the amorphous alloy and the ceramic material can be layered in a laminated structure, where the alternating layers of ceramic material and bulk amorphous are composed as shown in FIGS. 3 and 4.

Figure 5:
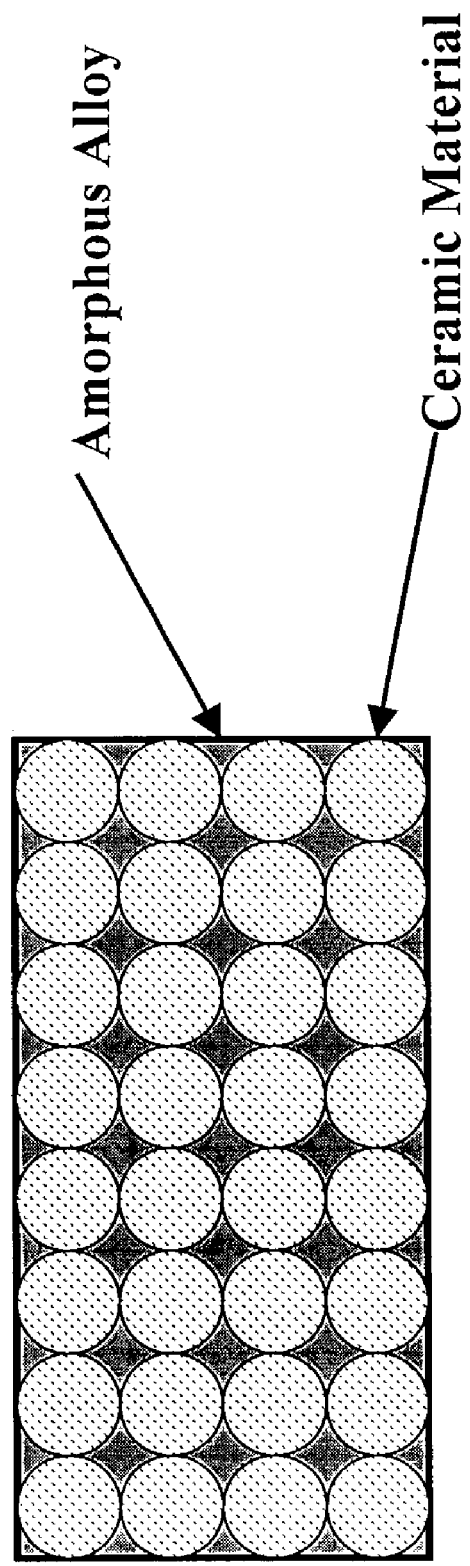
FIG. 5 is a schematic of a fifth exemplary embodiment of a composite armor in accordance with the present invention.

In yet another embodiment, a plurality of ceramic pieces may be embedded in an amorphous alloy matrix as shown in FIG. 5. In this case, the dimensions of the ceramic pieces are smaller than 2"×2". Such a plurality of ceramic pieces facilitates the preservation of the general structure of the ceramic-amorphous alloy composite by limiting the propagation of ceramic fracture throughout the whole structure as the cracks in ceramic will be arrested by the tougher metallic matrix. Such configurations are also desirable for reduced cost, as well as to making larger structures when larger size tiles are not readily available for a particular ceramic material. The shape of the ceramic pieces can be in any suitable form such as the cylindrical short rods shown in FIG. 5. Various configurations and shapes of ceramic pieces can be utilized as disclosed in U.S. Pat. No. 6,408,734.

In any of the above embodiments of the invention, the thickness of the amorphous layer may be varied. In one such embodiment, the thickness of the amorphous layer is less than 2.0 mm and preferably less than 1.0 mm. In these cases, the toughness and ductility of the amorphous alloy will be higher due to geometric constraints.

The ceramic core, according to the present invention, is formed in the shape of the desired armor component. The ceramic core preferably is comprised of a ceramic material selected from the group consisting of $Al_2O_3$, $B_4C$, SiC, $Si_3N_4$ and $TiB_2$. Preferably the ceramic material has a density 99% or higher. Although specific ceramics are described above, it will be understood that the principles of the invention are applicable to any ceramic material having high hardness.

The metallic outer coating is comprised of a bulk amorphous alloy. Such bulk solidifying amorphous alloys are recently discovered family of amorphous alloys, which may be cooled at substantially lower cooling rates, of about 500 K/sec or less, and substantially retain their amorphous atomic structure. As such, these materials may be produced in thickness of 1.0 mm or more, substantially thicker than conventional amorphous alloys, which require cooling rates of $10^5$ K/sec or more, and can only be cast to thicknesses of around 0.020 mm. U.S. Pat. Nos. 5,288,344; 5,368,659; 5,618,359; and 5,735,975 (whose disclosures are incorporated by reference in its entirety) disclose such bulk solidifying amorphous alloys. An exemplary family of bulk solidifying amorphous alloys is described by the molecular formula: $(Zr,Ti)_a(Ni,Cu,Fe)_b(Be,Al,Si,B)_c$, where a is in the range of from about 30 to about 75, b is in the range of from about 5 to about 60, and c in the range of from about 0 to about 50, in atomic percentages. Furthermore, these alloys may accommodate substantial amounts of other transition metals up to 20%, in atomic percent, such as Nb, Cr, V, Co. A preferable alloy family is $(Zr,Ti)_a(Ni,Cu)_b(Be)_c$, where a is in the range of from about 40 to about 75, b is in the range of from about 5 to about 50, and c in the range of from about 5 to about 50 in atomic percentages. Still, a more preferable composition is $(Zr,Ti)_a(Ni,Cu)_b(Be)_c$, where a is in the range of from about 45 to about 65, b is in the range of from about 7.5 to about 35, and c in the range of from about 10 to about 37.5 in atomic percentages. Another preferable alloy family is $(Zr)_a(Nb,Ti)_b(Ni,Cu)_c(Al)_d$, where a is in the range of from about 45 to about 65, b is in the range of from about 0 to about 10, c is in the range of from about 20 to about 40 and d in the range of from about 7.5 to about 15, in atomic percentages.

Such bulk solidifying amorphous alloys may sustain strains up to 1.5% or more without any permanent deformation or breakage. Further, these materials have high fracture toughness of 10 ksi-$\sqrt{in}$ or more, and preferably 20 ksi-$\sqrt{in}$ or more. Also, they have high hardness values of 4 GPa or more, and preferably 5.5 GPa or more. The yield strength level of bulk solidifying alloys range from 1.6 GPa and reach up to 2 GPa and more exceeding the current state of the Titanium alloys. Furthermore, the above bulk amorphous alloys have a density in the range of about 4.5 to 6.5 g/cc, and, as such, provide high strength to weight ratios. In addition, bulk solidifying amorphous alloys have very good corrosion resistance.

Another set of bulk-solidifying amorphous alloys are ferrous-based metal (Fe, Ni, Co) compositions. Examples of such compositions are disclosed in U.S. Pat. No. 6,325,868, and in publications to A. Inoue et. al., Appl. Phys. Lett., Volume 71, p 464 (1997); Shen et. al., Mater. Trans., JIM, Volume 42, p 2136 (2001); and Japanese patent application 2000126277 (Publ. #0.2001303218 A), all of which are incorporated herein by reference. One exemplary composition of such ferrous-based alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not processable to the degree of the Zr-base alloy systems, they can be still be processed in thicknesses around 1.0 mm or more, sufficient to be utilized in the current invention. In addition, although the ferrous-based alloys have generally higher densities, from 6.5 g.cc to 8.5 g/cc, their yield strength is also higher, ranging from 2.5 GPa to 4 GPa or more, making them particularly attractive for armor applications. Similarly, ferrous-based alloys have elastic strain limits of higher than 1.2% and generally about 2.0%. Ferrous metal-base bulk amorphous alloys also have very high yield hardnesses ranging from 7.5 GPA to 12 GPa.

In general, crystalline precipitates in bulk amorphous alloys are highly detrimental to these materials' properties, especially to the toughness and strength. As such, it is generally preferred to keep the volume fraction of crystalline precipitates to a minimum if possible. However, there are cases in which ductile crystalline phases precipitate in-situ during the processing of bulk amorphous alloys, and which are indeed beneficial to the properties of bulk amorphous alloys, especially to the toughness and ductility. Such bulk amorphous alloys comprising such beneficial precipitates are also included in the current invention. One exemplary case is disclosed in the publication to C.C. Hays et. al, Physical Review Letters, Vol. 84, p 2901, 2000, which is incorporated herein by reference.

Figure 6:
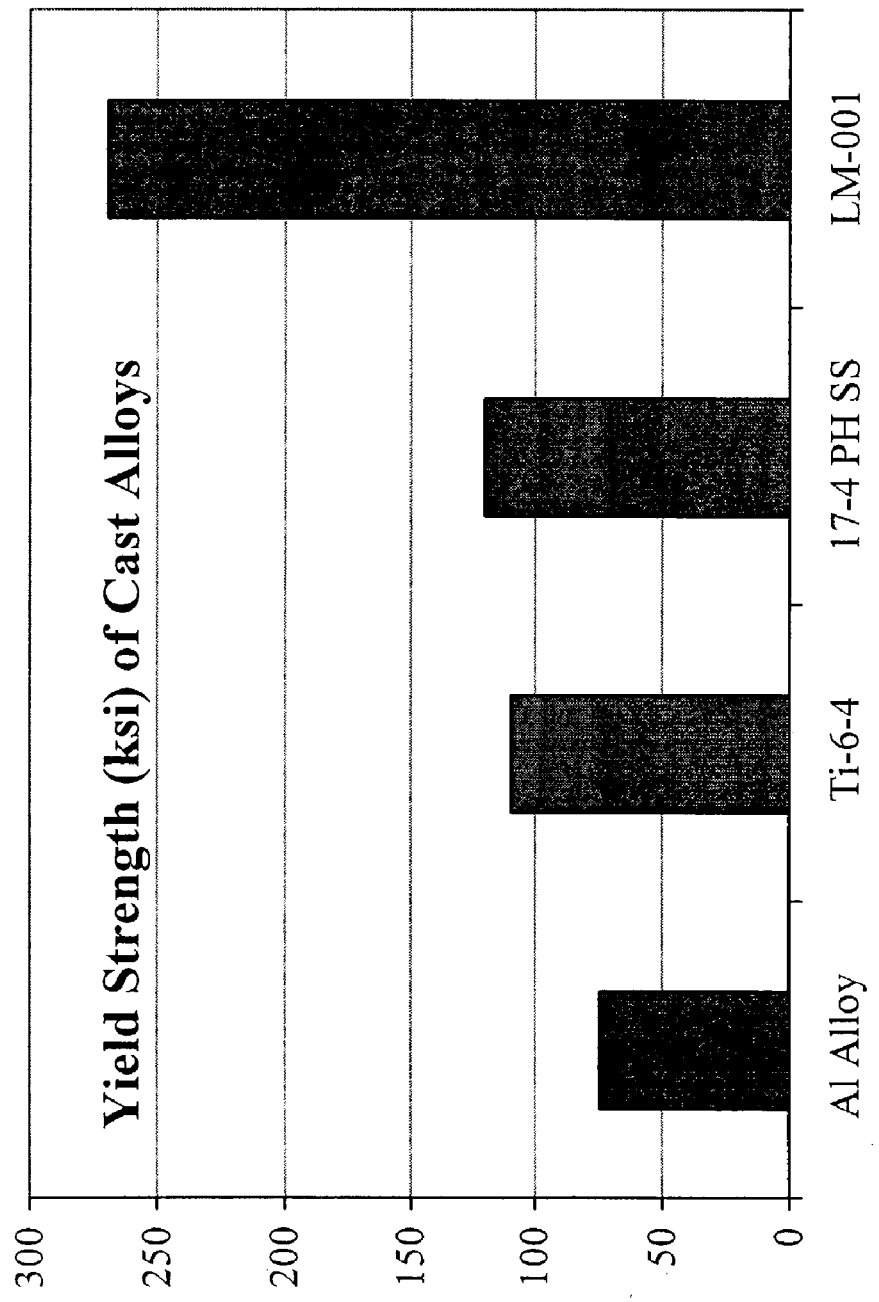
FIG. 6 is a graphical comparison of the yield strength properties of conventional metals and bulk amorphous alloys according to the present invention.

There are several advantages to using bulk amorphous alloys as a surrounding material in ceramic cores. First, the very high "yield" strength of bulk amorphous alloys can be utilized to constrain the ceramic core very effectively and impede the material's disintegration. Herein, the important strength parameter is the "yield" strength of the surrounding metal. When the armor package takes a hit, the ceramic core will tend to fracture and dimensionally expand due to opening cracks. In this situation, the surrounding metal will be forced to stretch out and the material's resistance to yielding will be an important factor in impeding the disintegration of the ceramic core. As shown in FIG. 6, bulk amorphous alloys (indicated, throughout the figures as LM-001, an Amorphous alloy manufactured by LiquidMetal Technologies, Inc.) have a yield strength of 1.6 GPa and more, much higher than conventional metals. The higher the yield strength is the higher resistance against disintegration forces and provides a more effective constrain.

Figure 7:
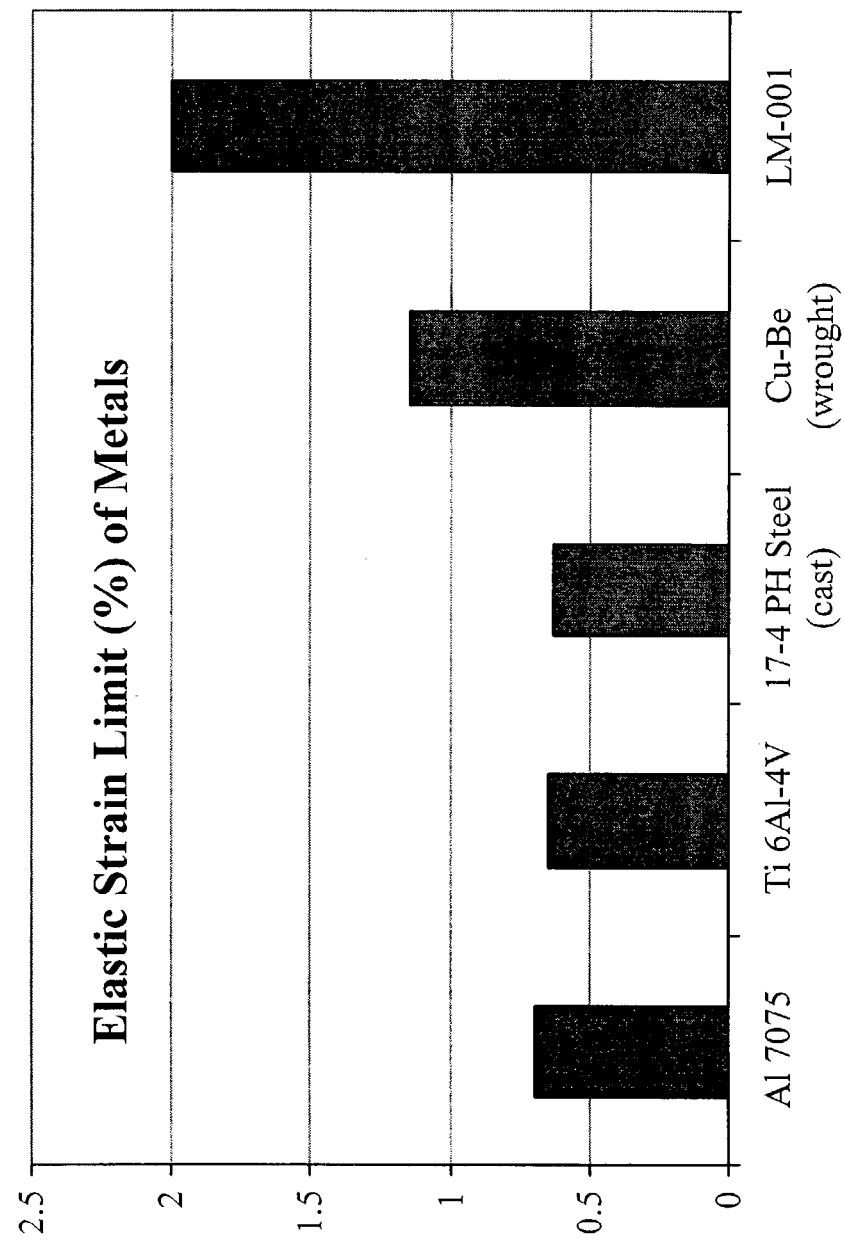
FIG. 7 is a graphical comparison of the elastic limit properties of conventional metals and bulk amorphous alloys according to the present invention.

Further, elastic strain limit also plays a similarly important role, as a material having a higher elastic limit provides a more effective constraint for the ceramic core. Accordingly, the higher the elastic limit, the better the hold the material will have on the ceramic core. As shown in FIG. 7, generally conventional metals have elastic strain limits of 0.6% or less. In contrast, bulk amorphous alloys have elastic strain limits higher than 1.2% and generally their elastic strain limit is about 2.0%. The unique combination of high yield-strength and high elastic limit of bulk amorphous metals makes them highly useful as a surrounding metal for ceramic cores since highly effective constraints for the ceramic core can be achieved and the integrity of the ceramic material can be preserved for multiple hits.

Another advantage of the bulk solidifying amorphous alloys is the deformation mechanism by localized shear bands. In the case of ceramic encapsulation, the deformation of amorphous alloys will be limited to a very small portion of the amorphous alloy, which will in effect keep the substantial portion of the amorphous alloy intact. This will allow the amorphous alloy to preserve the constraining effect on the ceramic and improving its effectiveness. In the case of conventional metal and alloys, the deformation of metallic component propagates throughout the most the structure and as such distorts and deprives the constraining action necessary to improve the effectiveness of ceramic component.

The current invention also provides a method for forming the bulk amorphous alloy encapsulated ceramic core. Further advantages of using bulk amorphous alloys as the surrounding material can be seen from the method of forming the bulk amorphous alloy encapsulated ceramic core. The methods described in the invention also provide a cost-effective process for encapsulation of ceramic cores with a very high yield-strength metal. Further, the methods provide a near-to-net shape forming process for the encapsulation of ceramic cores.

Figure 8:
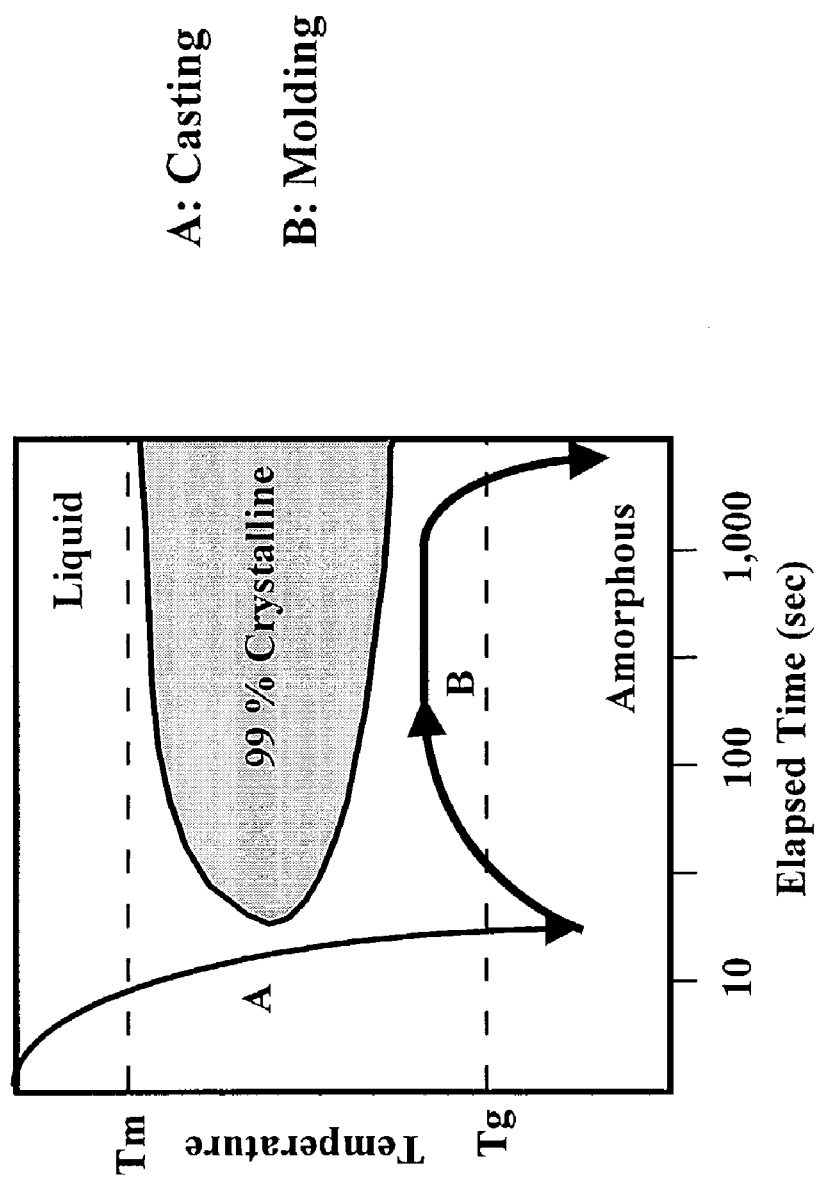
FIG. 8 is a graphical depiction of the processing routes for bulk amorphous alloys according to the present invention.

In one embodiment of the invention, the bulk amorphous alloy in molten form (above the melting temperatures of its crystalline phases) may be disposed so as to surround the ceramic core in a suitable mold by a casting method (route A as shown in FIG. 8). Various casting methods can be used such as permanent mold casting, counter gravity casting and die-casting. One such process, die-casting, is disclosed in U.S. Pat. No. 5,711,363, which is incorporated herein by reference. The bulk amorphous alloy is preferably disposed to surround the ceramic core uniformly so that a layer having uniform thickness will be formed upon solidification of the molten alloy. The amount of bulk amorphous alloy disposed around the ceramic core may be varied depending on the desired thickness of the layer.

Figure 9:
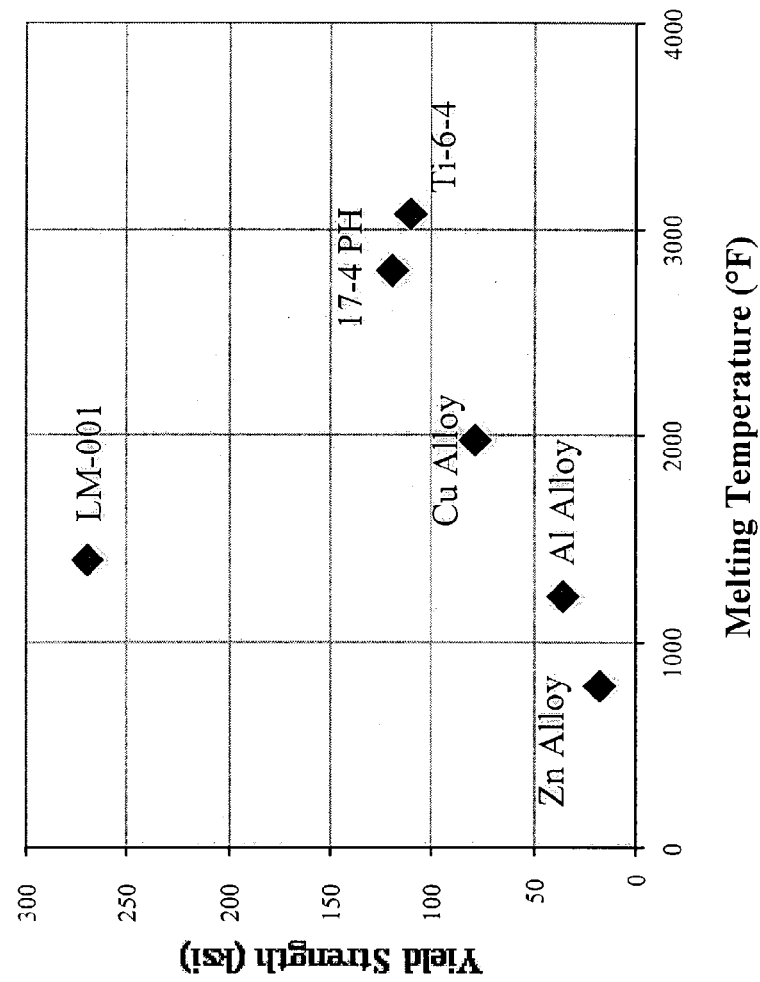
FIG. 9 is a graphical comparison of the yield strength versus melting temperature of conventional metals and bulk amorphous alloys according to the present invention.
Figure 10:
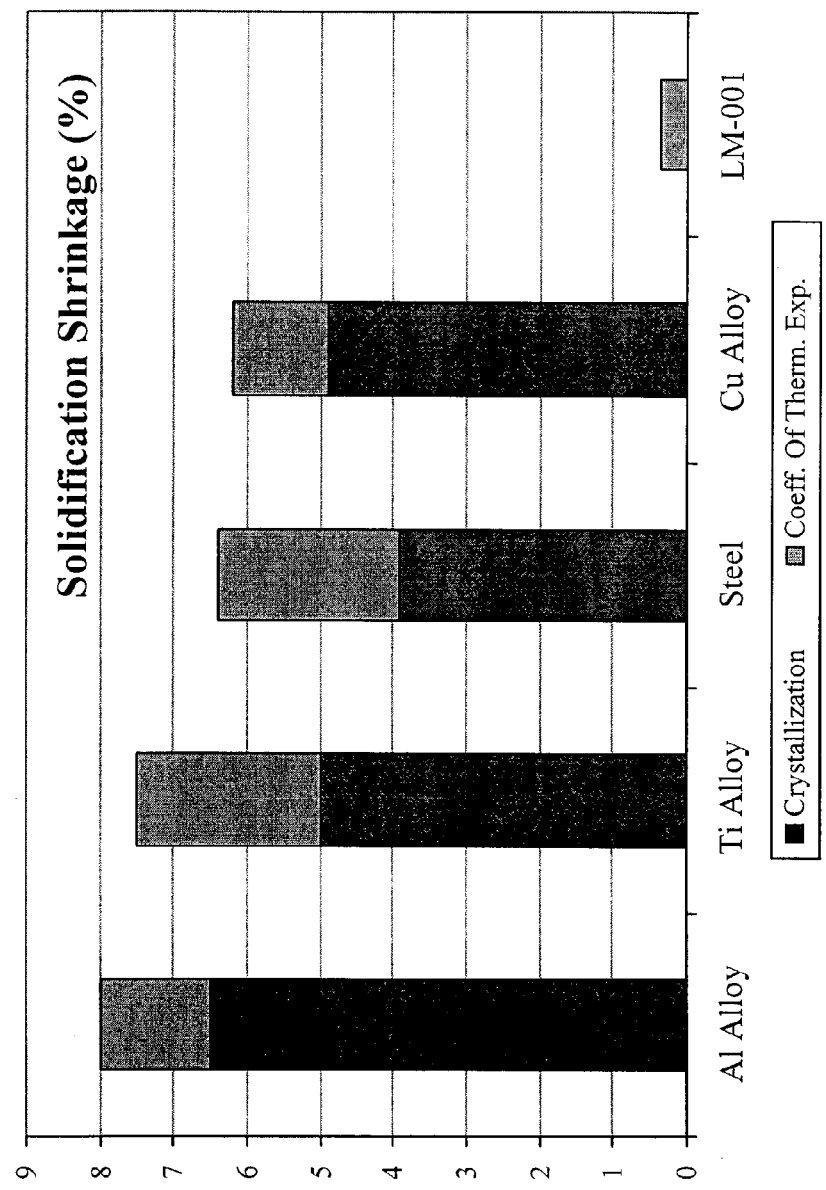
FIG. 10 is a graphical comparison of the solidification shrinkage of conventional metals and bulk amorphous alloys according to the present invention.

It should be noted that the above-mentioned casting operations are not generally available for high yield-strength materials and only the use of bulk-solidifying amorphous alloys allows the use of such casting processes in manufacturing encapsulated ceramics with very high-yield strength metals. As shown in FIG. 9 with the example of LM-001 (a Zr-base alloy) and other ordinary alloys, bulk-solidifying amorphous alloys exhibit a very high yield-strength compared to their melting temperatures. The high temperature melt processing degrades the properties of ceramics and the formation reaction products at the interface not only weakens the overall composite structure but also facilitates the formation and propagation of cracks in ceramic material. Further, as shown in FIG. 10, the solidification shrinkage of conventional metals is very high, which causes the fracture of ceramic components due to differential thermal stresses between the conventional metals and ceramics.

Figure 11:
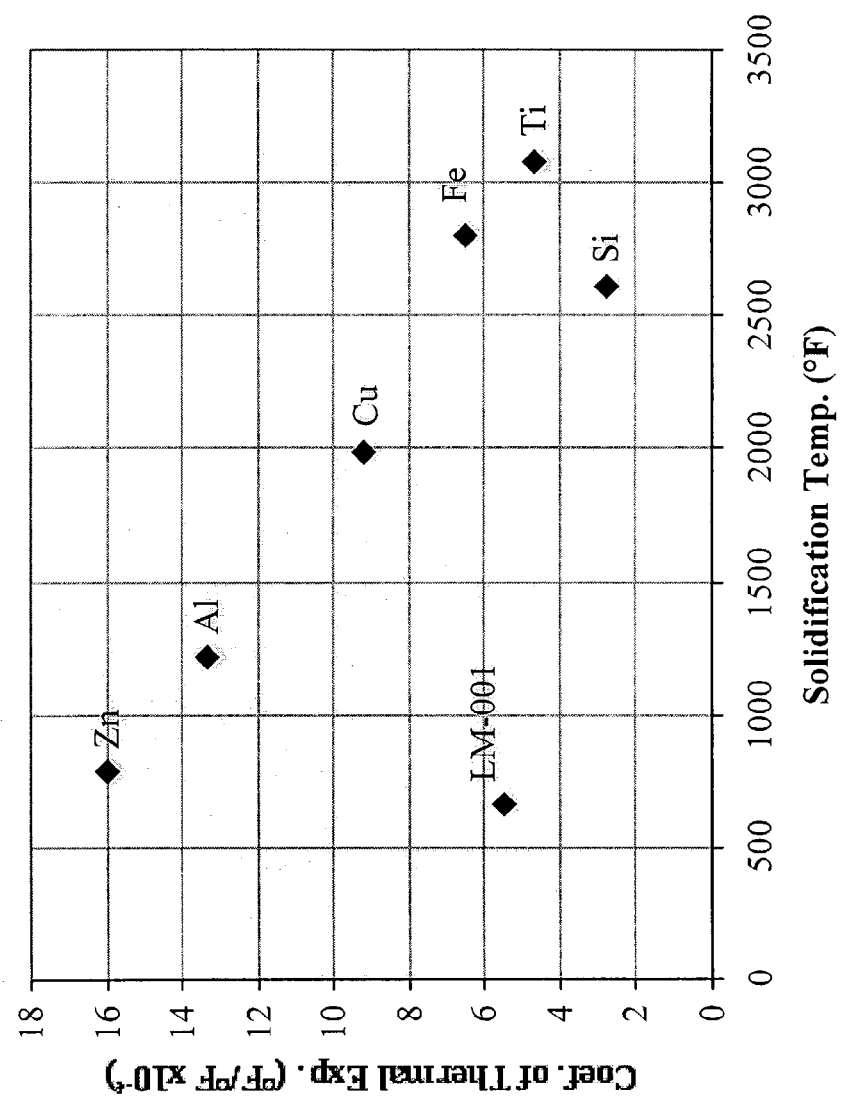
FIG. 11 is a graphical comparison of the coefficient of thermal expansion versus solidification temperature of conventional metals and bulk amorphous alloys according to the present invention.
Figure 12:
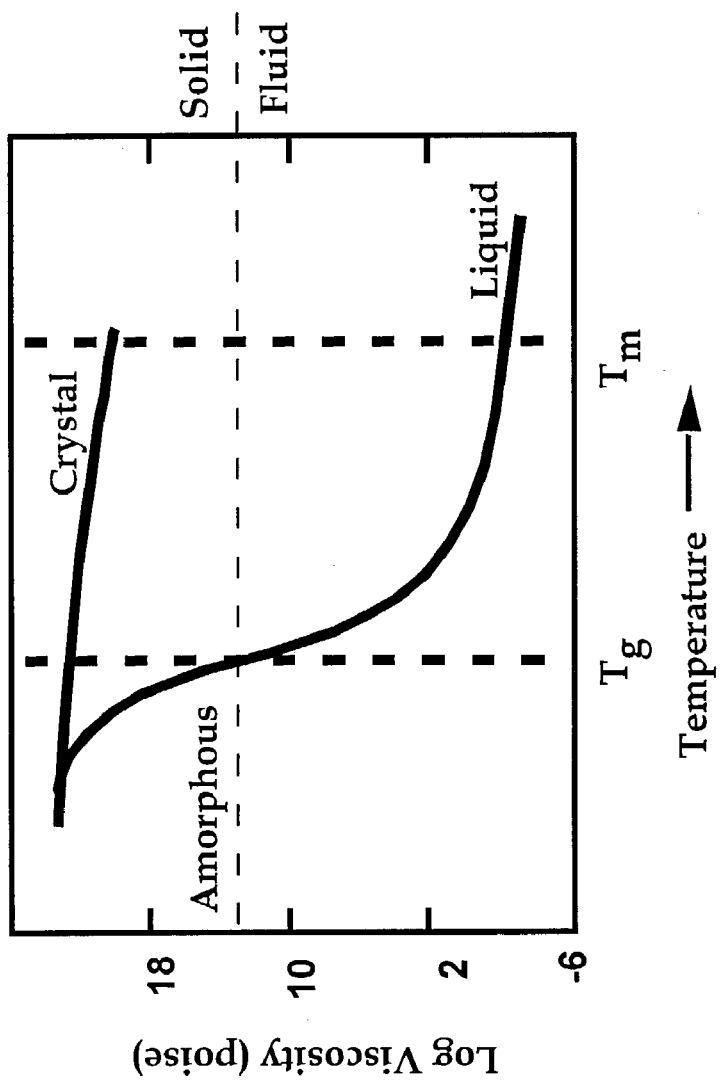
FIG. 12 is a graphical depiction of the solidification properties of bulk amorphous alloys according to the present invention.
Figure 13:
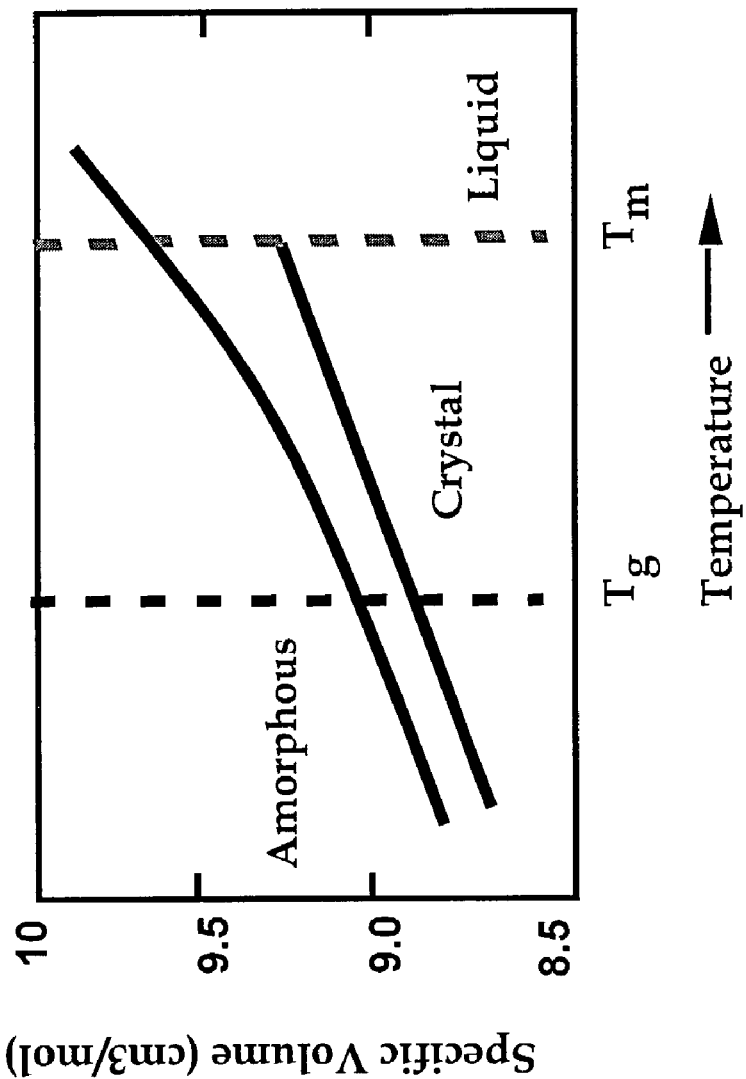
FIG. 13 is a graphical depiction of the solidification properties of bulk amorphous alloys according to the present invention.

As detailed in FIGS. 11 to 13, bulk amorphous alloys retain their fluidity from above the melting temperature down to the glass transition temperature due to the lack of a first order phase transition. This is in direct contrast conventional metals and alloys. Since, bulk amorphous alloys retain their fluidity, they do not accumulate significant stress from their casting temperatures down to below the glass transition temperature. As such, these characteristics of bulk amorphous alloys can be utilized to exert a highly beneficial compressive stress on the ceramic core. Such beneficial compressive stress makes the ceramic core to defeat the projectiles much more effectively by delaying the formation of cracks in the ceramic material.

The advantage of such compressive stresses is two-fold. First, the ceramic component will have a higher tensile strength and will be more effective in defeating the projectile as the projectile will spend more time (and energy) before it causes the ceramic component to develop cracks and fail. (Tensile stresses are the cause of the premature failure in ceramic components since in general ceramics have higher strength in compression than in tension.). This can allow the composite structure to defeat projectiles without any damage to the ceramic component and, therefore will allow the structure to take multiple hits. Secondly, after the defeat of first projectile, the compressive stresses on the ceramic component will be preserved due to the high elastic strain limit of amorphous alloy. As such, the ceramic will be held in place securely and evenly in case some damage, in the form of cracks, develop in the ceramic component. Even though the effectiveness of the system will be reduced (in the case of formation of cracks in ceramic), the compressive stresses will maintain the effectiveness of the ceramic for subsequent hits, and at the minimum will keep the uncracked portion of ceramic in place to defeat the projectile and dissipate its energy.

The compressive stresses are achieved by the differential thermal stresses generated through the different thermal expansion coefficients of the amorphous alloy and the ceramic material. Since ceramic materials have much lower coefficient of thermal expansion than the metallic alloys, the surrounding amorphous alloy will shrink more than the ceramic and apply a hydrostatic compressive stresses. Accordingly, in one embodiment of the invention, the ceramic core is left under a compressive stress of 400 MPa or more and more preferably under a compressive stress of 800 MPa or more.

The bonding at the interface of bulk-solidifying amorphous alloy and ceramic can take several forms. In one embodiment, the interface has intimate contact mechanically, but not necessarily chemically (or metalurgically). Such interfaces can be achieved with the below mentioned molding process. In another embodiment, a chemically bonded interface can be achieved. Such above described melt-processing can be effectively utilized to form such interfaces. The very low melting temperatures of bulk-solidifying amorphous alloys makes it possible to utilize a time-temperature window to control the melt reactivity to form chemical bonds with minimal reaction products. For example, Zr—Ti-base bulk-solidifying amorphous alloys have typical melting temperatures on the order of 650° C. to 850°, much lower than ordinary high-strength Ti base alloys (~1,600° C.). In such operations, it is desirable to heat the ceramic component to temperatures about the melt processing temperatures. In a casting process, to encapsulate the ceramic, time and temperature of casting parameters can be selected such that a chemical bond between the surrounding bulk amorphous alloy and ceramic core can be established. Zr—Ti base amorphous alloys are especially preferred for encapsulating ceramic components with chemically bonded interfaces. Herein, Zr—Ti base is defined as amorphous alloy composition having a total of Zr and Ti greater than 30% atomic percentage.

Although casting processes are discussed above, in another embodiment of the invention, a feedstock of bulk amorphous alloy as a solid piece in the amorphous form is provided and heated to about glass transition temperature or above (route B in FIG. 8). Subsequently, the bulk amorphous alloy, about the glass transition temperature or above, may be disposed so as to surround the ceramic core in a suitable molding and thermo-plastic process. A variety of molding operations can be utilized such as blow molding (clamping a portion of feedstock material and applying a pressure difference on opposite faces of the unclamped area), die-forming (forcing feedstock material into a die cavity), and replication of surface features from a replicating die. U.S. Pat. Nos. 6,027,586; 5,950,704; 5,896,642; 5,324,368; and 5,306,463 (each of whose disclosures is incorporated by reference in its entirety) disclose methods to form molded articles of amorphous alloys exploiting the glass transition properties of the materials. In such an embodiment, the bulk amorphous alloy is preferably disposed to surround the ceramic core uniformly so that a layer having uniform thickness will be formed upon solidification of the molten alloy. The amount of bulk amorphous metal disposed around the ceramic core may be varied depending on the desired thickness of the layer. Such processes allow to form a very intimate mechanical contact between the ceramic and amorphous alloy, and as such provides a more effective constraint to the ceramic than other methods that do not involve such interface diffusion bonding. It should be understood that the feedstock of amorphous alloy can also be in powder form and during the molding operation the powder can be consolidated around the ceramic core.

Although subsequent processing steps may be used to finish the amorphous alloy articles of the current invention, it should be understood that the mechanical properties of the bulk amorphous alloys and composites can be obtained in the as cast and/or molded form without any need for subsequent process such as heat treatment or mechanical working. In addition, in one embodiment the bulk amorphous alloys and their composites are formed into complex near-net shapes in the two-step process. In such an embodiment, the precision and near-net shape of casting and moldings is preserved.

Although specific embodiments are disclosed herein, it is expected that persons skilled in the art can and will design alternative amorphous alloy encapsulated ceramic armor devices and methods to produce the amorphous alloy encapsulated ceramic armor devices that are within the scope of the following claims either literally or under the Doctrine of Equivalents.

What is claimed is:

1. A ceramic armor comprising:
   a ceramic core; and
   a metallic layer formed from an amorphous alloy having a yield strength of at least 1.6 GPa and an elastic strain limit of at least 1.2%, the amorphous alloy encapsulating the ceramic core such that the metallic layer places the ceramic core under a compressive stress of at least 400 MPa, wherein at least a portion of the metallic layer formed from an amorphous alloy has a thickness of about 0.5 mm or more.

2. The ceramic armor as described in claim 1, wherein the amorphous alloy is described by the following molecular formula: $(Zr,Ti)_a(Ni,Cu, Fe)_b(Be,Al,Si,B)_c$, wherein "a" is in the range of from about 30 to 75, "b" is in the range of from about 5 to 60, and "c" in the range of from about 0 to 50 in atomic percentages.

3. The ceramic armor as described in claim 1, wherein the amorphous alloy is described by the following molecular formula: $(Zr,Ti)_a(Ni,Cu)_b(Be)_c$, wherein "a" is in the range of from about 40 to 75, "b" is in the range of from about 5 to 50, and "c" in the range of from about 5 to 50 in atomic percentages.

4. The ceramic armor as described in claim 1, wherein the amorphous alloy is a Zr—Ti base bulk solidifying amorphous alloy.

5. The ceramic armor as described in claim 1, wherein the amorphous alloy is described by the following molecular formula: $(Zr)_a(Nb,Ti)_b(Ni,Cu)_c(Al)_d$, wherein "a" is in the range of from about 45 to 65, "b" is in the range of from about 0 to 10, "c" in the range of from about 20 to 40, and "d" in the range of from about 7.5 to 15 in atomic percentages.

6. The ceramic armor as described in claim 1, wherein the amorphous alloy can sustain strains up to 1.5% or more without any permanent deformation or breakage.

7. The ceramic armor as described in claim 1, wherein the amorphous alloy has a high fracture toughness of at least about 10 ksi-$\sqrt{\text{in}}$.

8. The ceramic armor as described in claim 1, wherein the amorphous alloy has a high fracture toughness of at least about 20 ksi-$\sqrt{\text{in}}$.

9. The ceramic armor as described in claim 1, wherein the amorphous alloy has a high hardness value of at least about 4 Gpa.

10. The ceramic armor as described in claim 1, wherein the amorphous alloy has a high hardness value of at least about 5.5 GPa.

11. The ceramic armor as described in claim 1, wherein the amorphous alloy has a density in the range of about 4.5 to 6.5 g/cc.

12. The ceramic armor as described in claim 1, wherein the ceramic core is a material selected from the group consisting of $Al_2O_3$, $B_4C$, SiC, $Si_3N_4$ and $TiB_2$.

13. The ceramic armor as described in claim 1, wherein the ceramic core has a density of 99% or higher.

14. The ceramic armor as described in claim 1, wherein the amorphous alloy is based on ferrous metals wherein the hardness of the amorphous alloys is about 7.5 Gpa and higher.

15. The ceramic armor as described in claim 1, wherein the amorphous alloy further comprises a ductile metallic crystalline phase precipitate.

16. The ceramic armor as described in claim 1, wherein the metallic layer fully surrounds the ceramic core.

17. The ceramic armor as described in claim 1, wherein the metallic layer has a substantially uniform thickness.

18. The ceramic armor as described in claim 1, wherein the metallic layer is chemically bonded to the ceramic core.

19. The ceramic armor as described in claim 1, wherein the metallic layer applies a compressive stress of 800 Mpa or more to the ceramic core.

20. The ceramic armor as described in claim 1, wherein at least one face of the ceramic core is exposed.

21. The ceramic armor as described in claim 1, further comprising a plurality of independent ceramic cores at least partially encapsulated by the metallic layer.

22. The ceramic armor as described in claim 1, comprising a plurality of alternating layers of the ceramic core and the metallic layer.

23. The ceramic armor as described in claim 1, wherein the metallic layer is less than 2.0 mm.

* * * * *